United States Patent
Zhang et al.

(10) Patent No.: US 12,422,563 B2
(45) Date of Patent: Sep. 23, 2025

(54) DIFFERENTIAL METHODS FOR ENVIRONMENT ESTIMATION, LIDAR IMPAIRMENT DETECTION, AND FILTERING

(71) Applicant: Waymo LLC, Mountain View, CA (US)

(72) Inventors: Jingyuan Linda Zhang, Menlo Park, CA (US); Kanika Sachdev, Sunnyvale, CA (US); Caner Onal, Palo Alto, CA (US); Michael Marx, Mountain View, CA (US); Yuchi Wang, Ann Arbor, MI (US)

(73) Assignee: Waymo LLC, Mountain View, CA (US)

( * ) Notice: Subject to any disclaimer, the term of this patent is extended or adjusted under 35 U.S.C. 154(b) by 465 days.

(21) Appl. No.: 18/068,503

(22) Filed: Dec. 19, 2022

(65) Prior Publication Data

US 2024/0201391 A1    Jun. 20, 2024

(51) Int. Cl.
  *G01S 17/95*    (2006.01)
  *G01S 7/487*    (2006.01)
  *G01S 17/42*    (2006.01)

(52) U.S. Cl.
  CPC ............ *G01S 17/95* (2013.01); *G01S 7/4873* (2013.01); *G01S 17/42* (2013.01)

(58) Field of Classification Search
  CPC ........ G01S 17/95; G01S 7/4873; G01S 17/42; G01S 7/497; G01S 7/4815; G01S 17/931
  See application file for complete search history.

(56) References Cited

U.S. PATENT DOCUMENTS 8,810,796 B2    8/2014    Hays et al.
10,885,398 B2   1/2021    Wang et al.
(Continued)

FOREIGN PATENT DOCUMENTS

CN    113720785    11/2021

OTHER PUBLICATIONS

Yoshiki Tatebe, et al., Pedestrian Detection from Sparse Point-Cloud using 3DCNN, IEEE, 2018, downloaded Oct. 13, 2022 from IEEE Xplore.
(Continued)

*Primary Examiner* — Alexander Satanovsky
(74) *Attorney, Agent, or Firm* — MCDONNELL BOEHNEN HULBERT & BERGHOFF LLP

(57) ABSTRACT

Example embodiments relate to differential methods for determining environment estimation, lidar impairment detection, and filtering. An example embodiment includes dividing a plurality of lidar device channels into a first group and a second group and interleaving the channels. The embodiment includes applying a threshold to the first group. The embodiment further includes emitting light pulses from a lidar device into an environment surrounding the lidar device, and detecting return light pulses. The return light pulses in the first group of channels are sampled from the signals that exceed the threshold. The embodiment may further include determining a differential in a statistical distribution between the return light pulses in the first group and the return light pulses in the second group. Based on the differential, the method can include detecting an atmospheric scattering medium in the environment surrounding the lidar device.

20 Claims, 9 Drawing Sheets

(56) References Cited

U.S. PATENT DOCUMENTS

| | | |
|---|---|---|
| 11,156,717 B2 | 10/2021 | Lingg et al. |
| 11,209,544 B2 | 12/2021 | Pacala et al. |
| 11,327,178 B2 | 5/2022 | Li et al. |
| 2018/0284226 A1* | 10/2018 | LaChapelle .............. G01S 17/10 |
| 2019/0361099 A1* | 11/2019 | Satat ....................... G01S 7/487 |
| 2020/0241136 A1 | 7/2020 | Pang et al. |
| 2020/0256999 A1 | 8/2020 | Yellepeddi et al. |
| 2021/0302554 A1* | 9/2021 | Sang ..................... G01S 7/4861 |
| 2021/0342609 A1 | 11/2021 | Smolyanskiy et al. |
| 2022/0171061 A1 | 6/2022 | Kim et al. |
| 2022/0187448 A1 | 6/2022 | Shand et al. |
| 2023/0044157 A1* | 2/2023 | White ................... G01S 7/4817 |

OTHER PUBLICATIONS

Extended European Search Report from European Application No. 23212122.8, dated Apr. 23, 2024.

* cited by examiner

DIFFERENTIAL METHODS FOR ENVIRONMENT ESTIMATION, LIDAR IMPAIRMENT DETECTION, AND FILTERING

BACKGROUND

Unless otherwise indicated herein, the description in this section is not prior art to the claims in this application and is not admitted to be prior art by inclusion in this section.

A Light Detection and Ranging (lidar) device is used for sensing aspects of an environment. In operation, one or more light emitters emit light into an environment surrounding the lidar device, and one or more light detectors may detect reflected light. Based on time differences between light emissions and receiving the reflected light, the lidar device can generate data that can be used to generate three-dimensional (3D) point cloud data that can be interpreted to render a representation of the environment. Atmospheric scattering media that affect visibility in the environment, such as rain, fog, and snow, can also be determined by the representation. However, current techniques to estimate visibility include using lidar pulse intensity and return density to determine the short-range visibility around the vehicle. Therefore, the visibility estimate is very localized.

SUMMARY

The present disclosure generally relates to a method of determining an estimate in atmospheric scattering media in the mid to long range for visibility surrounding a vehicle. Particularly, a computing system can leverage data from lidars by using differentials between lidar channels in order to determine the presence of an atmospheric scattering medium.

In one aspect, the present application describes a method for determining environment estimation, lidar impairment detection, and filtering. The method may include dividing a plurality of light detection and ranging (lidar) device channels into at least a first group of channels and a second group of channels. The first group of channels and the second group of channels can be interleaved. The method can further include applying a threshold to at least the first group of channels. The method can additionally include emitting light pulses from a lidar device into an environment surrounding the lidar device, and detecting return light pulses in the first group of channels and the second group of channels. Return light pulses in the first group of channels are sampled from the signals that exceed the threshold. The method can additionally include determining a differential in a statistical distribution between the return light pulses in the first group of channels and the return light pulses in the second group of channels. Based on the differential, the method can also include detecting an atmospheric scattering medium in the environment surrounding the lidar device.

In another aspect, the present application describes a method. The method may include determining that a first lidar device and a second lidar device have an overlapping field of view. The method can also include applying a threshold to the first lidar device. The method can further include emitting light pulses from the first lidar device and emitting light pulses from the second lidar device into an environment surrounding the lidar devices. The method can additionally include detecting return light pulses from the first lidar device at the first lidar device. Return light pulses from the first lidar device are sampled from the signals that exceed the threshold. The method also includes detecting return light pulses from the second lidar device at the second lidar device, and determining a differential in a statistical distribution between the return light pulses from the first lidar device and the return light pulses from the second lidar device. Based on the differential, the method also includes detecting an atmospheric scattering medium in the environment surrounding the first lidar device and the second lidar device.

In yet another aspect, the present invention describes a system for determining environment estimation, lidar impairment detection, and filtering. The system may include a lidar device, which includes a light detector, and a controller. The controller may include at least one processor and a non-transitory computer-readable medium. The non-transitory computer-readable medium may store a set of program instructions to be executed by the at least one processor so as to carry out operations. The operations may include dividing a plurality of lidar device channels into at least a first group of channels and a second group of channels. The first group of channels and the second group of channels can be interleaved. The method can further include applying a threshold to at least the first group of channels. The method can additionally include emitting light pulses from a lidar device into an environment surrounding the lidar device, and detecting return light pulses in the first group of channels and the second group of channels. Return light pulses in the first group of channels are sampled from the signals that exceed the threshold. The method can additionally include determining a differential in a statistical distribution between the return light pulses in the first group of channels and the return light pulses in the second group of channels. Based on the differential, the method can also include detecting an atmospheric scattering medium in the environment surrounding the lidar device.

These as well as other aspects, advantages, and alternatives will become apparent to those of ordinary skill in the art by reading the following detailed description, with reference, where appropriate, to the accompanying drawings.

DETAILED DESCRIPTION

Figure 1:
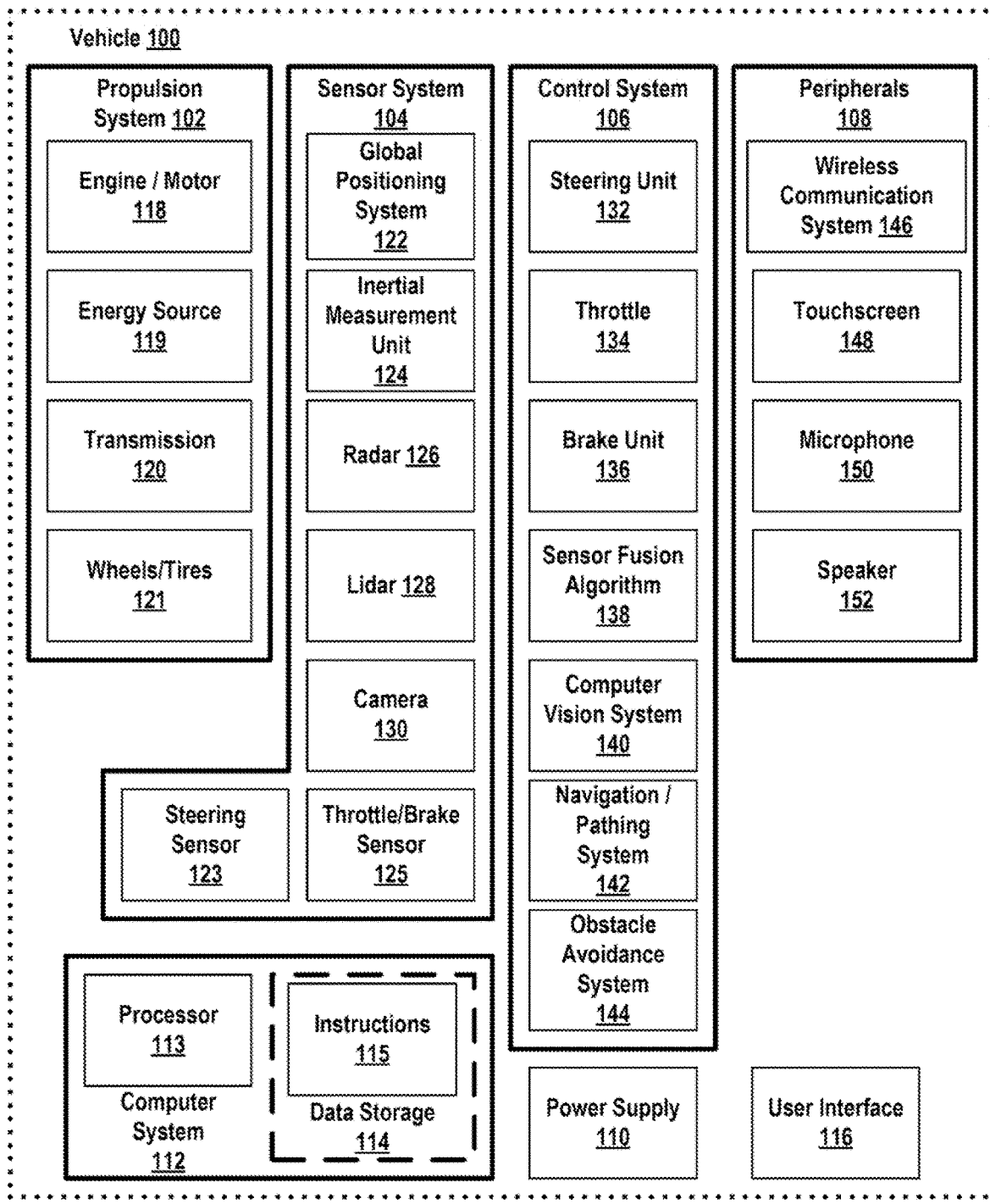
FIG. 1 is a functional block diagram illustrating a vehicle, according to example embodiments.
Figure 2A:
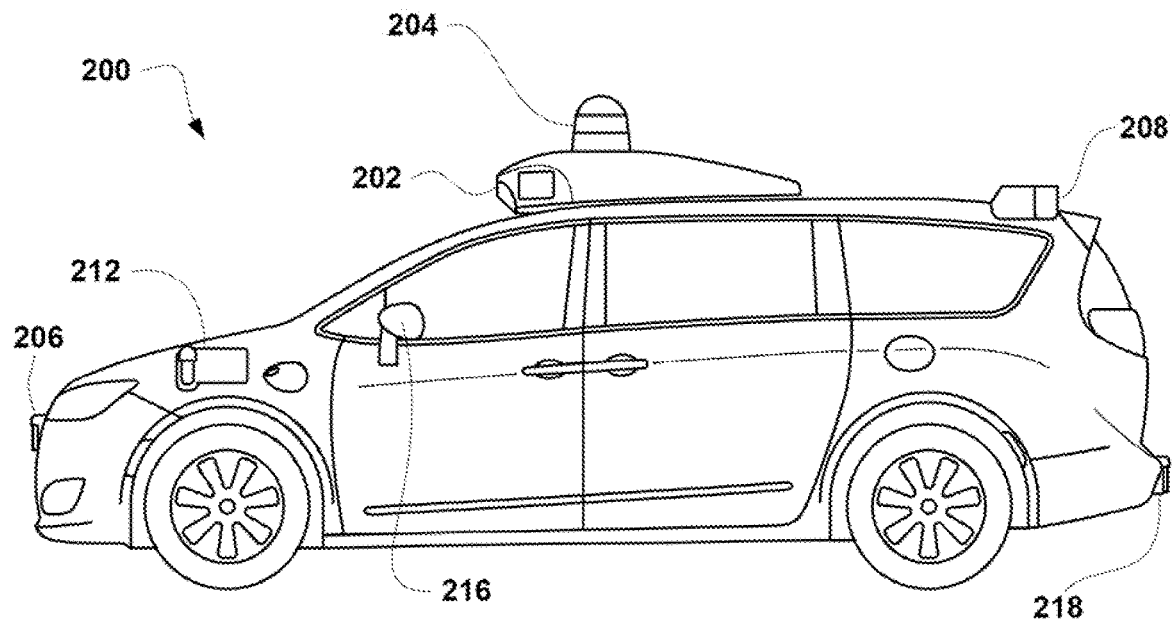
FIG. 2A is an illustration of a physical configuration of a vehicle, according to example embodiments.
Figure 2B:
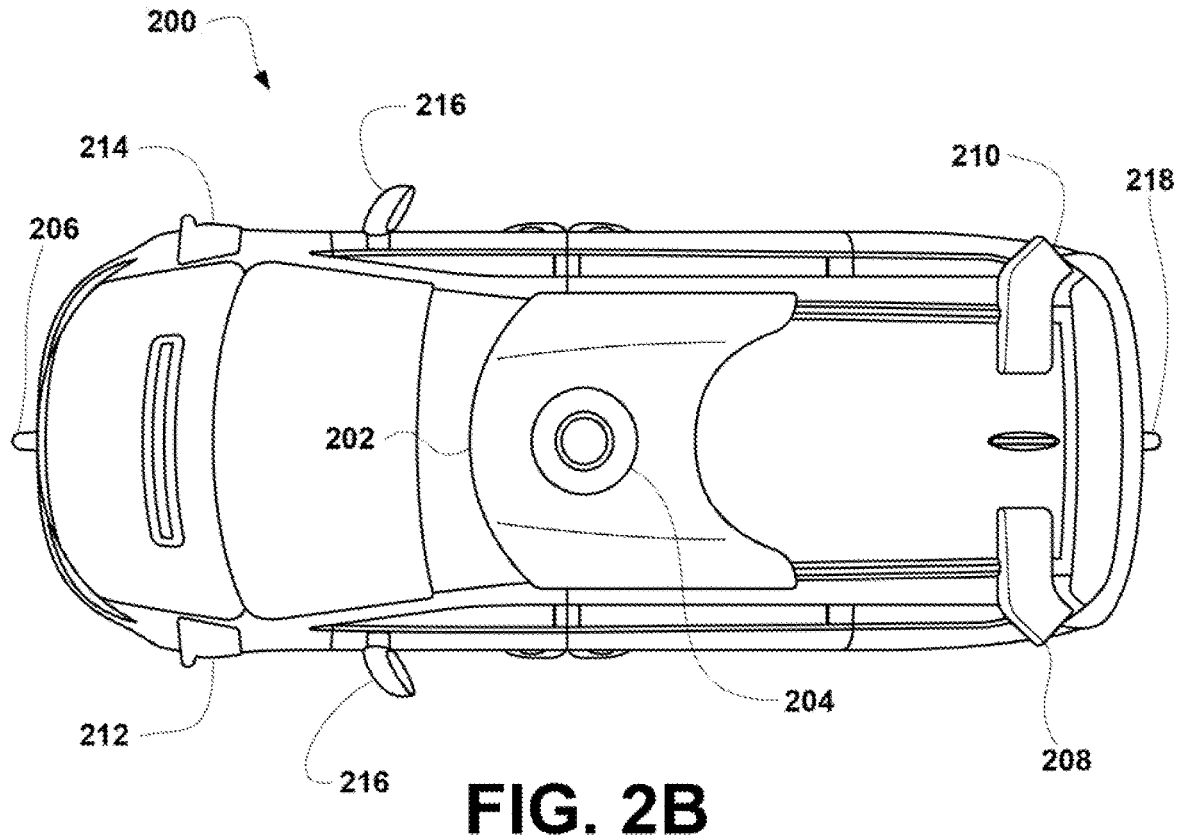
FIG. 2B is an illustration of a physical configuration of a vehicle, according to example embodiments.
Figure 2C:
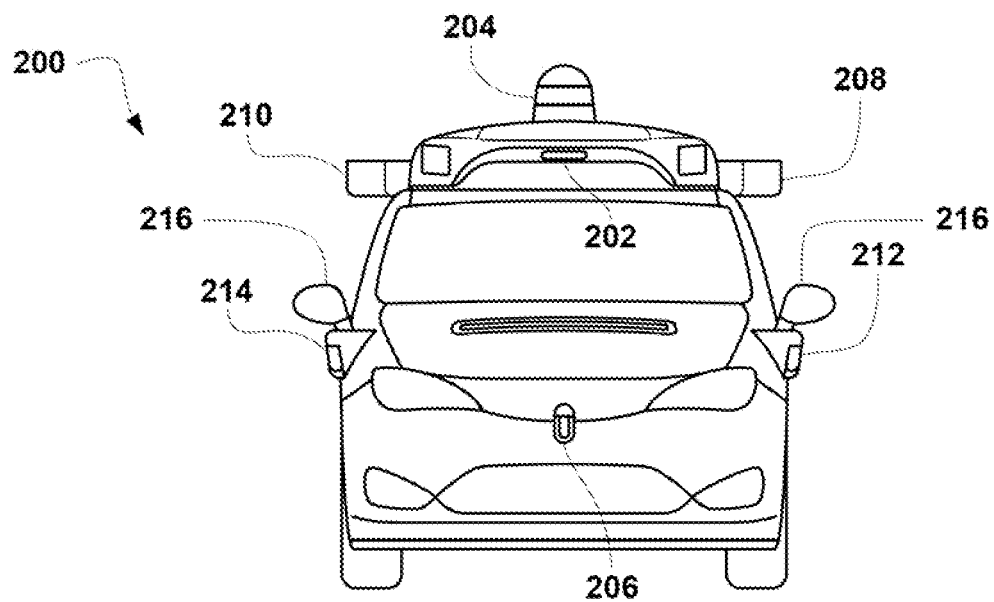
FIG. 2C is an illustration of a physical configuration of a vehicle, according to example embodiments.
Figure 2D:
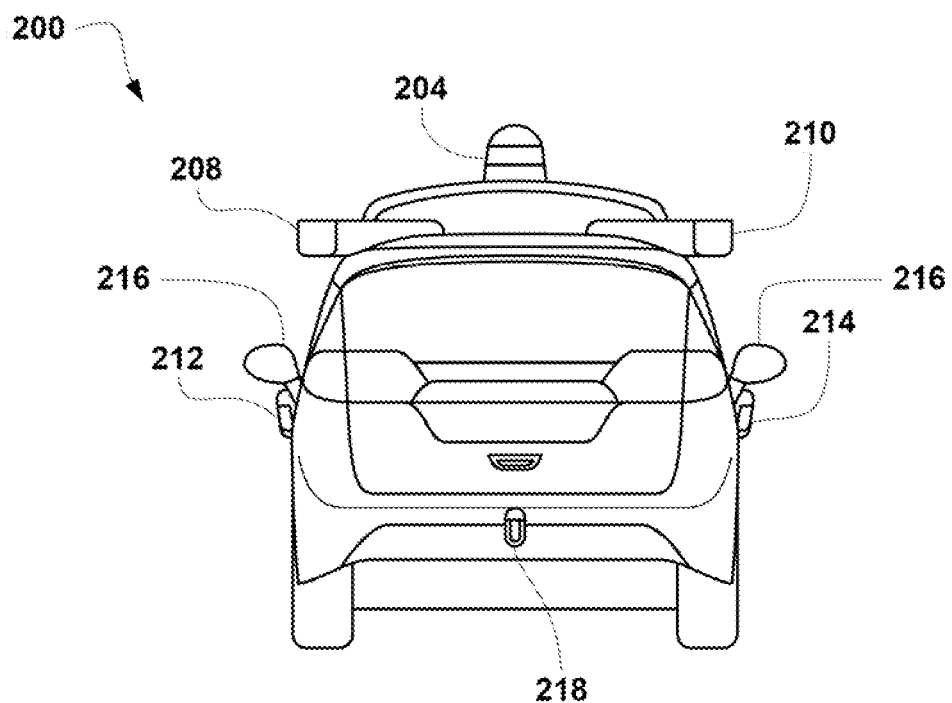
FIG. 2D is an illustration of a physical configuration of a vehicle, according to example embodiments.
Figure 2E:
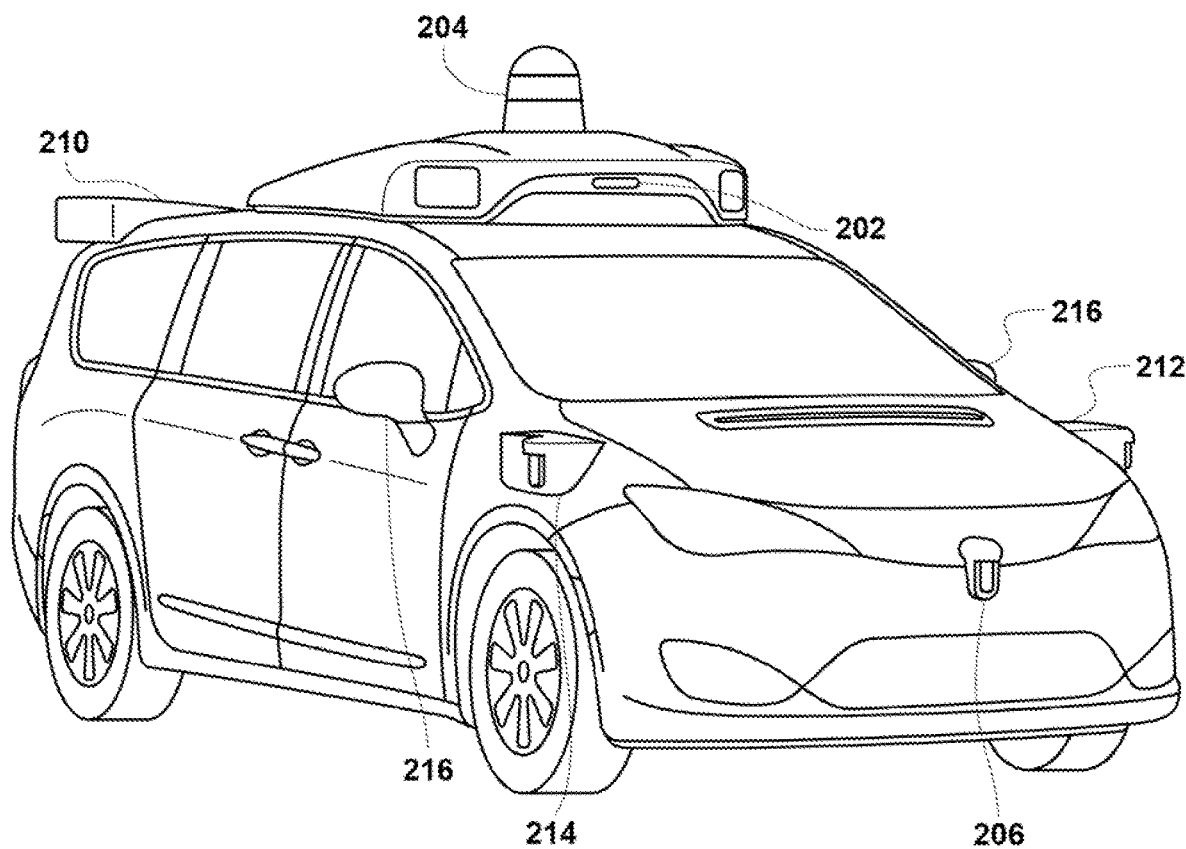
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Current techniques to estimate visibility surrounding lidar devices include using lidar return intensity and return density to determine the local visibility around the vehicle. However, because short range lidars may be used, only the returns within the first 1 to 3 meters from the short range lidar might be used. Thus, the visibility estimate is very localized.

By leveraging data from longer range lidars and by using the differentials between lidar channels, a computing system can determine an estimate in the medium to long range for visibility surrounding a vehicle. This differential method can involve applying a threshold to a subset of the lidar channels within the lidar. In example embodiments, the lidar channels are divided into two groups: a "threshold" group and a "non-threshold" group. The group of channels that apply the threshold have less sensitivity, and are therefore less sensitive to dim returns, whereas the group of channels without the threshold maintain their sensitivity to dim returns. The slight offset in the sensitivity of the detector creates a differential in the sensitivity to the dim returns. Dim returns can be the result of fog, rain, sleet, hail, dust, haze, smog and snow, or other atmospheric scattering media (e.g., any weather conditions that interfere with the behavior of lidar pulses.). The difference in the statistical distribution between several metrics between the threshold and non-threshold channels, can be used to estimate whether or not there is an atmospheric scattering medium surrounding the vehicle. For example, by comparing where light pulse returns are in each channel, a computing system can determine the presence of an atmospheric scattering medium.

In an example embodiment, the channels are interleaved. For example, the channels are interleaved so that there are two channels with the threshold, one without, then two with the threshold and one without. Any number of channels could be used with any pattern or arrangement.

By looking at the difference in the statistical distribution of several metrics between the two groups, the system could: (1) estimate medium to long range environment factors such as visibility, thus enforcing the operational driving domain; (2) estimate the hardware impairment; and (3) spatially resolve (locate) areas containing atmospheric scattering media for downstream filtering.

Five metrics can be used to assist in determining the above three goals. The first metric is to take advantage of excess return metrics to determine the presence and location of atmospheric scattering media. The applicable coordinate system can be voxelized and in each voxel the excess return can be calculated. The excess returns are how many more returns there are from the non-threshold channels (which are more sensitive) compared to the threshold channels. If there is an atmospheric scattering medium, there is a more positive differential in the excess returns. Clear weather gives zero differential.

Second, the difference in median range of the last return pulse between the two groups of channels can be used. By looking at the difference in median range of the last return between the two groups of channels, the presence and density of atmospheric scattering medium in a certain pitch and yaw direction can be inferred. The density of the atmospheric scattering medium can be used to estimate lidar visibility in a specific direction.

Third, the difference in the median range of the noise returns between the two groups of channels can show correlation with the visibility estimate.

Fourth, the difference in the noise returns between the two groups of channels at different percentile ranges can show correlation with the estimated visibility. For example, the difference in the interquartile range of the noise returns between the two groups of channels.

Fifth, the difference between the average number of returns per beam between the two groups of channels correlates with the estimated Meteorological Optical Range (eMOR).

The goal is to understand the environmental degradation as well as whether the lidar is being affected (e.g., partially impaired) by atmospheric scattering medium. Methods included herein may also help explain where atmospheric returns are located around a lidar so that they can be better filtered.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trains, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones or sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones or sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, or intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
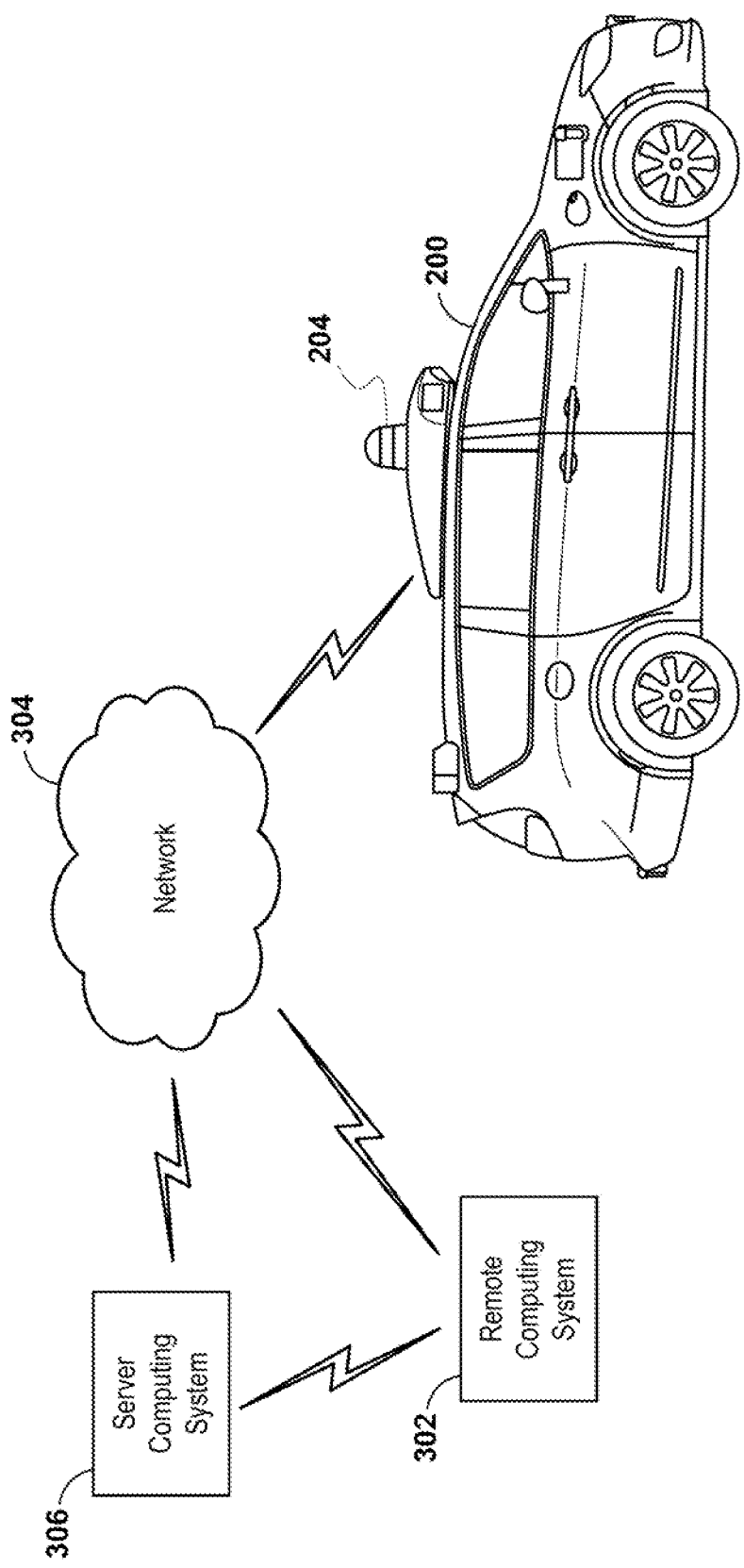
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii)

correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects.

When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
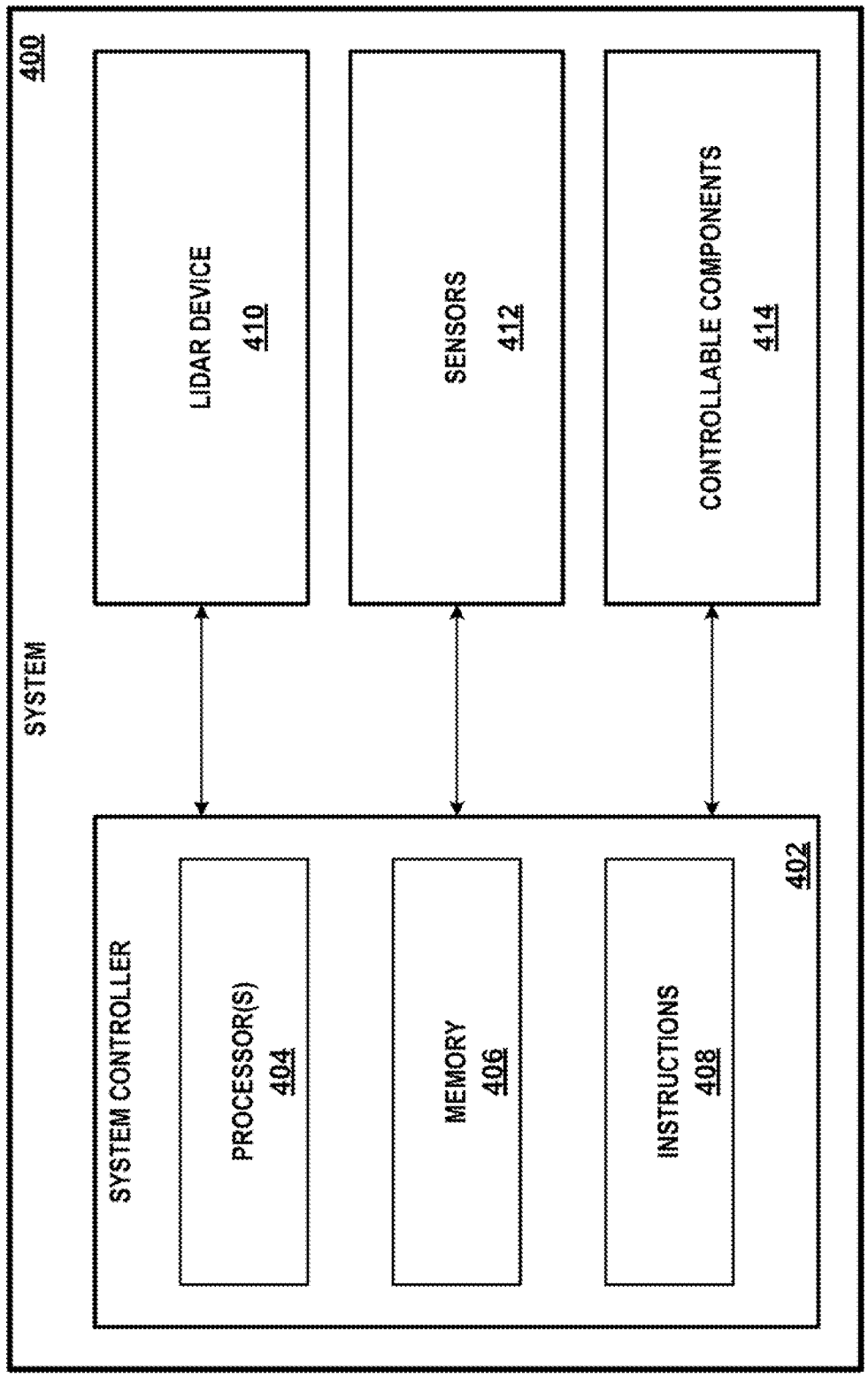
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, or proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, additional lidar devices, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
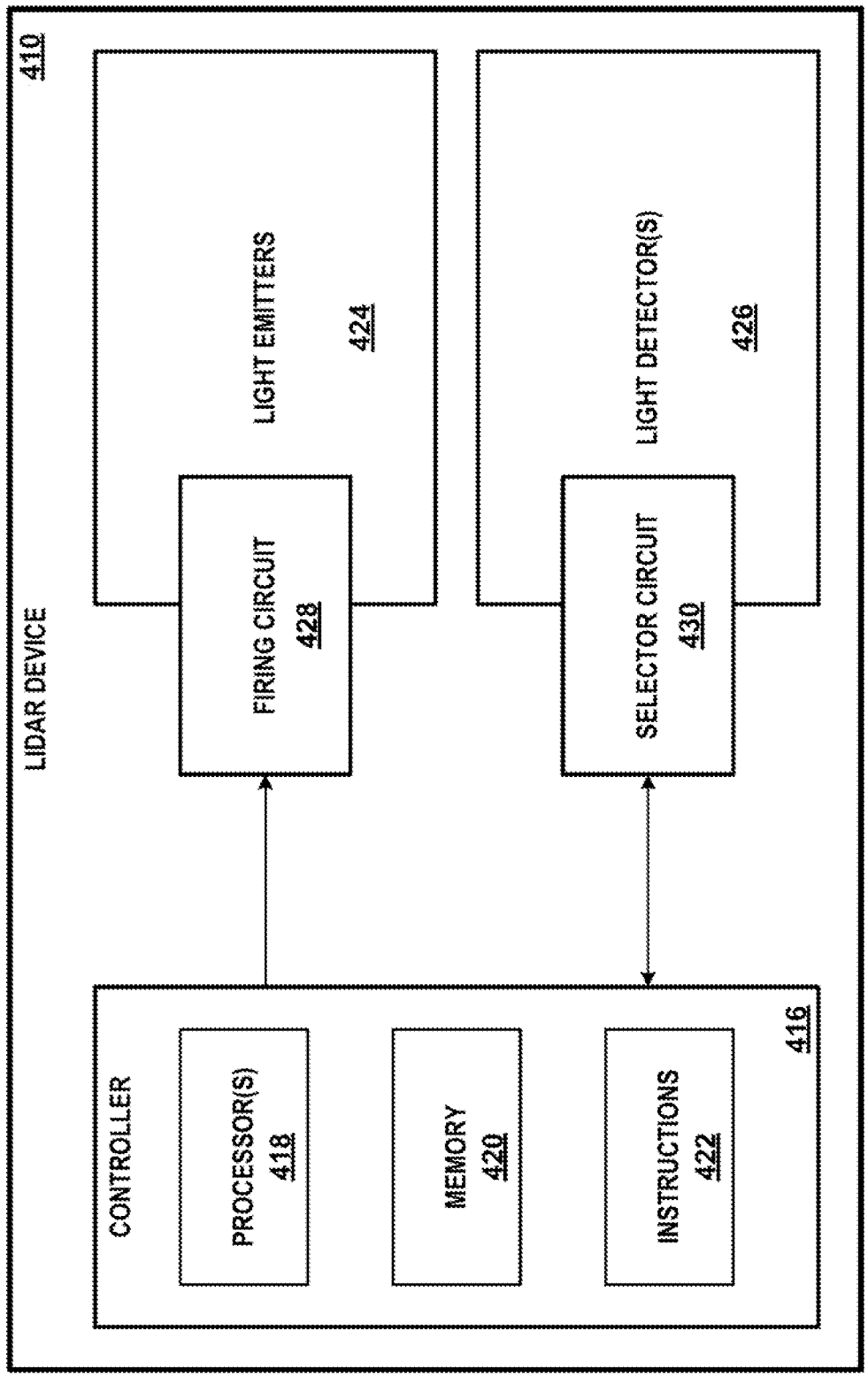
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, PW DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

Figure 5:
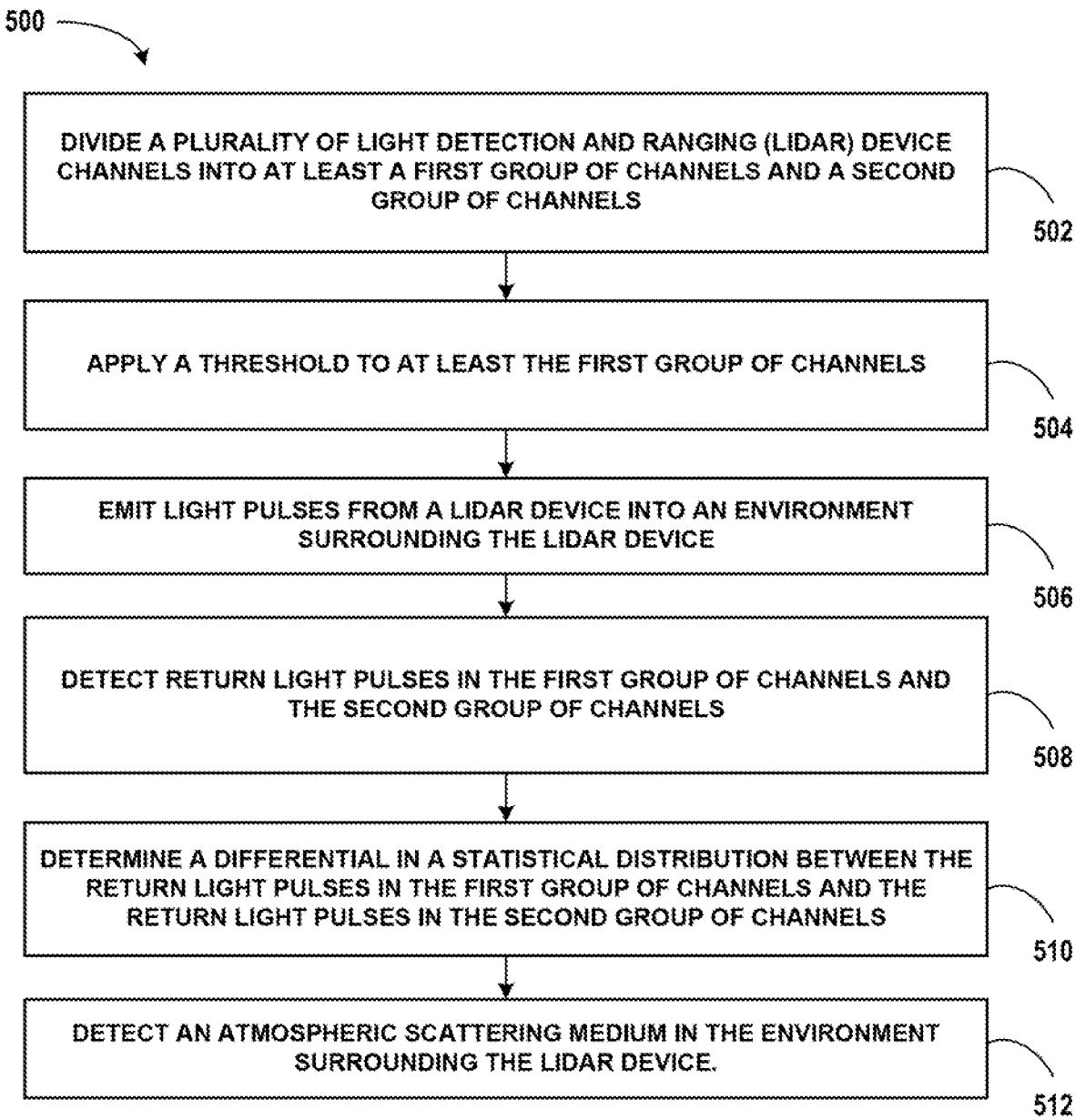
FIG. 5 is a flow chart illustrating a method, according to an example embodiment.

In an example embodiment the lidar device in FIG. 4B can perform a plurality of operations. FIG. 5 illustrates example operations 500 for the lidar device to perform. The operations are directed toward determining an estimate of atmospheric scattering media in the mid to long range surrounding a vehicle (e.g., from 3 meters to 100 meters). For example, by leveraging data from long range lidars and by using the differentials between a set of lidar channels that have a threshold and a set of lidar channels that do not have a threshold, a computing system can determine an estimate in the mid to long range for visibility surrounding a vehicle. The method may include dividing a plurality of lidar device channels into at least a first group of channels and a second group of channels 502, applying a threshold to at least the first group of channels, 504, emitting light pulses from a lidar device into an environment surrounding the lidar device 506, detecting return light pulses in the first group of channels and the second group of channels 508, determining a differential in a statistical distribution between the return light pulses in the first group of channels and the return light pulses in the second group of channels 510, and based on the differential, detecting an atmospheric scattering medium in the environment surrounding the lidar device 512.

Block 502 may include dividing the plurality of lidar device channels into at least a first group of channels and a second group of channels. The lidar device may include a plurality of vertically offset channels, which are an unvarying number of laser beams. In an example embodiment, the channels may be divided into two groups. In some embodiments the two groups of channels are interleaved, in other embodiments the two groups of channels are not interleaved. One embodiment could also include dividing the channels into two groups horizontally. For example, by alternating shot-to-shot. The two groups of channels could then be interleaved horizontally.

In an interleaved example, the first group of channels and the second group of channels may alternate in an every-other pattern (i.e., channel from the first group, channel from the second group, channel from the first group, etc.). In an alternative embodiment, the first group of channels and the second group of channels can be interleaved in a pattern of two first groups of channels and one second group of channels. (i.e., channel from the first group, channel from the first group, channel from the second group, channel from the first group, channel from the first group, channel from the second group, etc.).

In an alternative embodiment, the plurality of lidar device channels could be divided into more than two groups. Any number of groups is possible. For example, there could be a first group of channels, a second group of channels, and a third group of channels. The groups of channels may still be interleaved as described above. An example with three groups of lidar channels is further described below.

Block 504 may include applying a threshold to at least the first group of channels. The threshold may be a ramped-in-time threshold that is set on a per-shot basis. The ramp refers to changing the threshold as a function of the time that the lidar detector listens for return light pulses. In an example embodiment, signals generated by a light detector that do not reach the threshold are filtered out.

The lidar channels that are vertically and/or horizontally offset are divided into two groups, threshold versus non-threshold, where the group of channels that apply the threshold ramp have less sensitivity, and are less sensitive to dim returns, and vice versa. The slight offset in the sensitivity of the detector creates a differential in the sensitivity to the dim returns. Dim returns can be the result of atmospheric scattering media such as fog, rain, sleet, and snow. The threshold channels allow the lidar device to see "through" atmospheric scattering media, while the non-threshold channels would be able to detect the atmospheric scattering medium.

As previously discussed, the channels are interleaved, and they are further interleaved based on the threshold. For example, the channels are interleaved so that there are two channels with the threshold, one without, then two with the threshold and one without. Any number of channels could be used with any pattern or arrangement.

Block 506 may include emitting light pulses from a lidar device into an environment surrounding the lidar device. The environment surrounding the lidar device could be the areas, at any distance, all around the lidar. For example, the lidar device is configured to emit light pulses into an environment and to generate a signal resulting from reflections of the emitted light pulses. Many times, the reflections of the emitted light pulses are by one or more objects in the environment. In some embodiments reflections of the emitted light pulses are by the atmospheric scattering medium in the environment surrounding the lidar device.

Block 508 may include detecting return light pulses in the first group of channels and the second group of channels. The detector listens to the incoming light as a time-domain signal and samples the signal at a fixed rate. For the signals from the first group of channels, the samples that exceed the threshold are preserved. For example, return pulses reflected off of atmospheric scattering media are dim and therefore will be rejected by the threshold, while return pulses reflected off of objects are not dim so they will exceed the threshold and will be preserved. For the signals from the second group of channels, the samples do not have to meet a threshold to be preserved. In other words, return pulses resulting from reflections off of atmospheric scattering media may be preserved. Groupings of contiguous samples that are preserved are considered pulses. The pulses are then further processed.

Block 510 may further include determining a differential in a statistical distribution between the return light pulses in the first group of channels and the return light pulses in the second group of channels. When the return light pulses from the first group of channels, which includes the threshold, and the return light pulses from the second group of channels, which does not include the threshold, are gathered they can be compared against each other. These comparisons can give insight into the environment and the presence of atmospheric scattering media. For example, the comparison could be to determine differentials in the distribution of the light pulses from the first group of channels, which includes the threshold, and the return light pulses form the second group of channels, which does not include the ramped threshold.

In one embodiment, determining the differential in the statistical distribution between the return light pulses in the first group of channels and the return light pulses in the second group of channels can include first voxelizing a coordinate system of the lidar device. Once the coordinate system of the lidar device is voxelized, a computing system can determine for each voxel, excess return light pulses. The excess return light pulses are the difference between the return light pulses in the first group of channels and the second group of channels. For example, the difference is how many more return light pulses in the second group of channels there are versus in the first group of channels due to the threshold. Based on determining a positive difference, the computing system can detect that there is a presence of atmospheric scattering medium in the environment surrounding the lidar device. In an example when there is no atmospheric scattering medium in the environment surrounding the lidar device the difference would be zero. This embodiment can be used to build a three-dimensional map of where the atmospheric scattering medium may be.

In another embodiment, determining the differential in the statistical distribution between the return light pulses in the first group of channels and the return light pulses in the second group of channels can include first determining a pitch and a yaw direction associated with both a last return pulse in the first group of channels and a last return pulse in the second group of channels. Next, a computing system can determine a difference, in the determined pitch and yaw direction, between the median range of a last return pulse in the first group of channels and the median range of a last return pulse in the second group of channels. Based on the difference, the computing system can detect a presence of atmospheric scattering medium in the pitch and the yaw direction. This embodiment can be used to determine the presence and density of atmospheric scattering medium in the pitch and yaw direction. A positive difference indicates a presence of an atmospheric scattering medium. The greater the difference, the denser the atmospheric scattering medium. Alternatively, a difference of zero indicates that there is no atmospheric scattering medium in the pitch and yaw direction.

In another embodiment, determining the differential in the statistical distribution between the return light pulses in the first group of channels and the return light pulses in the second group of channels can include first determining a median range of noise returns in the first group of channels and a median range of noise returns in the second group of channels. The noise returns can be determined using a threshold in measured intensity of the returns. Returns below the threshold can be designated as noise. Next, a computing system can determine a difference between the median range of noise returns in the first group of channels and the median range of noise returns in the second group of channels. The computing system may determine a visibility estimate based on the difference. A difference indicates the presence of an atmospheric scattering medium, and the greater the difference the denser the atmospheric scattering medium.

In another embodiment, determining the differential in the statistical distribution between the return light pulses in the first group of channels and the return light pulses in the second group of channels can include determining a first range delta between at least two range values at predetermined percentiles of noise returns in the first group of channels, and determining a second range delta between at least two range values at predetermined percentiles of noise returns in the second group of channels. In an example embodiment, the range deltas are the difference in range of noise returns at two percentiles. For example, the range deltas can be the range of noise returns at 25% versus the range of noise returns at 75%. In an example embodiment, the predetermined percentiles can be interquartile, in other words 25% and 75%. Alternatively, the predetermined percentiles can be 50% and 90%. Other ranges are also possible. In an example embodiment, the predetermined percentiles in the first group of channels and the second group of channels are the same. Once the first range delta is determined for the first group of channels, and the second range delta is determined for the second group of channels, an example embodiment can include determining a range difference between the first range delta of the first group of channels and the second range delta of the second group of channels. A difference indicates the presence of an atmospheric scattering medium, and the greater the difference the denser the atmospheric scattering medium. A difference of zero can indicate that no atmospheric scattering media are present. An example embodiment can then include, determining, based on the range difference, a visibility estimate.

In another embodiment, determining the differential in the statistical distribution between the return light pulses in the first group of channels and the return light pulses in the second group of channels can include first determining an average number of return light pulses per emitted light pulses in the first group of channels and an average number of return light pulses per emitted light pulses in the second group of channels. Next, a computing system can determine a difference between the two averages. Based on a positive difference, the computing system can determine that there is atmospheric scattering medium present and can estimate visibility depending on how large the difference is.

Block 512 may include, using a computing system to detect an atmospheric scattering medium in the environment surrounding the lidar device, based on the previously determined differential. Any of the previously described methods can be used to determine the differential. One goal is to understand the environmental degradation due to the atmospheric scattering medium as well as whether the lidar is being partially blinded by the atmospheric scattering medium. The methods can also be used to determine where atmospheric returns are located around a lidar so that they can be better filtered.

As previously mentioned, an example embodiment can include dividing the plurality of channels into three groups of channels in order to determine accuracy of the results of determining the presence of atmospheric scattering medium. First, a computing system may divide the lidar device channels into more than two groups. For example, the first group of channels, the second group of channels, and a third group of channels. As previously mentioned, the first group of channels, the second group of channels, and the third group of channels are interleaved (i.e., channel from the first group, channel from the second group, channel from the third group, channel from the first group, etc.).

An example embodiment can include applying a first threshold to the first group of channels and a second threshold to the second group of channels. The thresholds may be ramped-in-time thresholds that are set on a per-shot basis. Ramped refers to changing the threshold as a function of the time that the lidar listens for return pulses. In an example embodiment, the first threshold and the second threshold filter signals generated by a light detector that do not exceed the thresholds.

The embodiment can further include emitting light pulses from a lidar device into an environment surrounding the lidar device, as previously described. The lidar detector may then detect return light pulses in the first group of channels, the second group of channels, and the third group of channels. The return light pulses in all three channels may be reflected from objects in the same direction. The return light pulses in the first group of channels are sampled from the signals that exceed the first threshold, and the return pulses in the second group of channels are sampled from the signals that exceed the second threshold.

The embodiment may also include determining (i) a first differential in a statistical distribution between the return light pulses in the first group of channels and the return light pulses in the second group of channels. (ii) a second differential in a statistical distribution between the return light pulses in the first group of channels and the return light pulses in the third group of channels, and (iii) a third differential in a statistical distribution between the return light pulses in the second group of channels and the return light pulses in the third group of channels. The differentials in statistical distribution can be determined by using any of the methods previously described.

The embodiment can then include comparing the first differential, second differential, and third differential to determine if at least two of the differentials match. If at least two of the differentials match, then the computing system can trust the overall results of the method. However, if no two differentials match, the computing system will know that it cannot trust the overall results.

In an alternative embodiment, instead of applying a threshold to the first group of channels, the pulses that are emitted by the first group of channels can have a different level of transmit power than the pulses that are emitted by the second group of channels. As previously stated, the lidar channels can include a plurality of vertically offset channels and/or a plurality of horizontally offset channels. In an example embodiment, the first group of channels can have a first power level that is lower than the power level of the second group of channels. As previously discussed, the first group of channels can be interleaved with the second group of channels. The channels may be interleaved in patterns previously discussed. In other embodiments the two groups of channels are not interleaved.

In an alternative embodiment, the plurality of lidar device channels could be divided into more than two groups with different power levels. Any number of groups is possible. For example, there could be a first group of channels, a second group of channels, and a third group of channels. The groups of channels may still be interleaved as described above.

The lidar channels that are vertically and/or horizontally offset are divided into two groups, a low power first group versus a high power second group, where the group of channels that have high power emit more laser power, and are more likely to generate atmospheric dim returns, and where the group of channels that have low power emit lower power and are less likely to generate atmospheric returns. The slight offset in the transmit power creates a differential in the likelihood of generating dim returns, which can be used to generate the differentials in measurable metrics as previously described. Return light pulses can be detected in the first group and the second group. An example embodiment can then include determining a differential in a statistical distribution between the return light pulses in the first group of channels and the return light pulses in the second group of channels, as previously described, to determine the presence of an atmospheric scattering medium.

Figure 6:
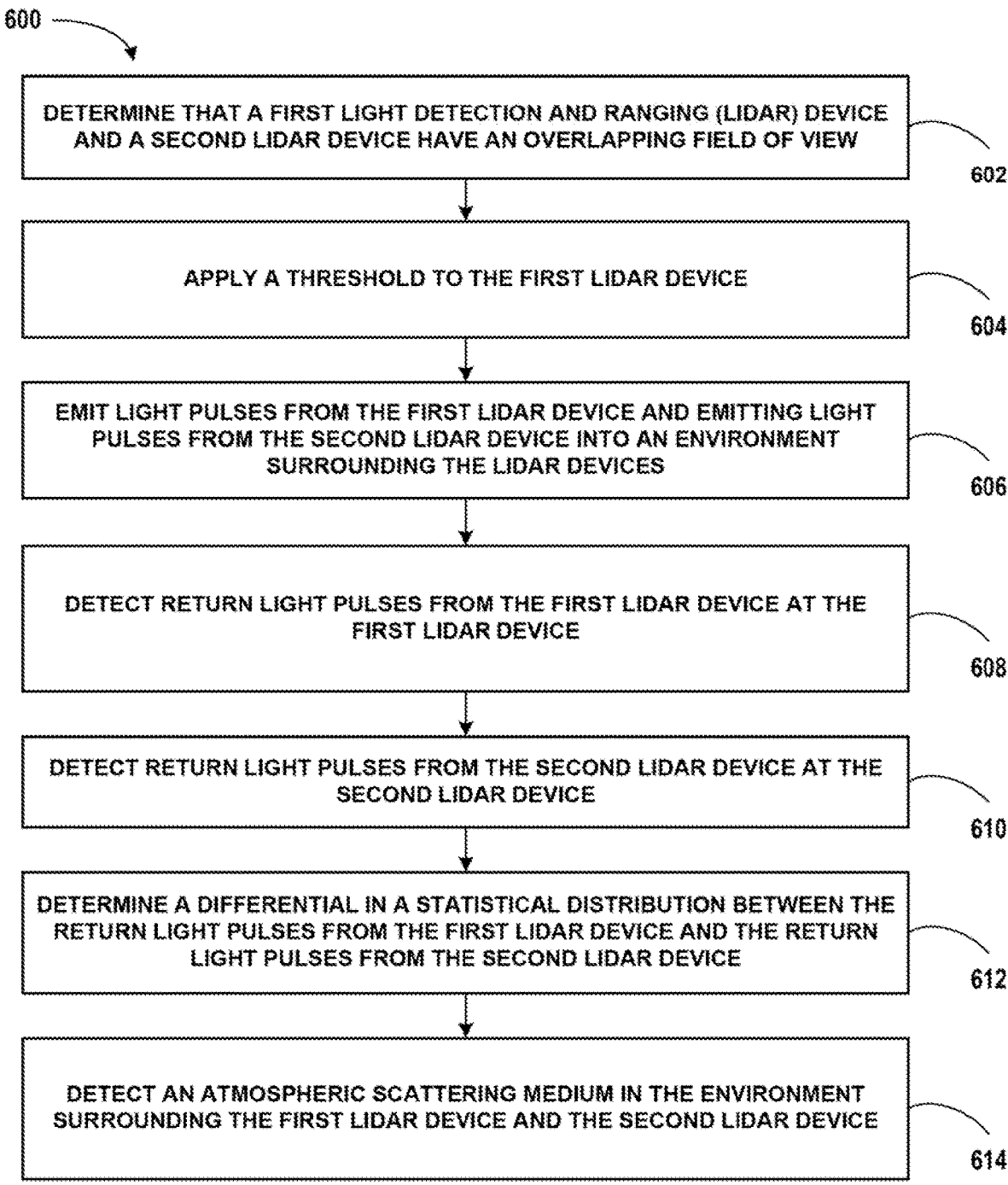
FIG. 6 is a flow chart illustrating a method, according to an example embodiment.

In an example embodiment, the lidar device in FIG. 4B could be in a system with an additional lidar device, for example lidar device 410 can be accompanied by an additional lidar device in the sensors 412. The two lidar devices could perform a plurality of operations. FIG. 6 illustrates example operations 600 for the lidar device to perform. The operations are directed toward generating contrast via differential sensitivity between two lidar beams looking at the same region of space. The contrast in the differential sensitivity can be used to determine the presence and the density of an atmospheric scattering medium.

Block 602 can include determining that a first lidar device and a second lidar device have an overlapping field of view. In an example embodiment, the first lidar device and the second lidar device may have a field of view that is at least partially overlapping, but not completely overlapping. Alternatively, the field of views could be the same.

Block 604 can include applying a threshold to the first lidar device. The threshold may be applied to all of the channels of the lidar device. The threshold may be a ramped-in-time threshold that is set on a per-shot basis. In an example embodiment, the threshold filters signals generated by a light detector that do not exceed the threshold. Because of the threshold, the first lidar may be less sensitive to dim returns resulting from atmospheric scattering media, while still detecting returns from objects. Therefore, the first lidar device can see "through" atmospheric scattering media. Alternatively, the second lidar device, which does not have a threshold applied to it, would detect the atmospheric scattering media.

Block 606 may include emitting light pulses from the first lidar device and emitting light pulses from the second lidar device into an environment surrounding the lidar devices. The lidar devices may each emit their own light pulses. As previously stated, the environment surrounding the lidar devices could be the areas, at any distance, all around the lidar devices. The emitted light pulses from the first lidar device and the second lidar device may reflect off of objects in the environment and off of atmospheric scattering medium present in the environment. The lidar devices may each generate a signal resulting from reflections of the emitted light pulses.

Block 608 may include detecting return light pulses from the first lidar device at the first lidar device. The return light pulses may be light pulses reflected from objects or atmospheric scattering medium present in the environment. The detector at the first lidar device listens to the return light pulses as a time-domain signal and samples the signal at a fixed rate. For the signals from the first lidar device, the samples that exceed the threshold are preserved. Return pulses reflected off of atmospheric scattering media are dim and therefore will not reach the threshold and will not be preserved. Groupings of contiguous samples that are preserved are considered pulses. These pulses may penetrate any atmospheric scattering medium that is present to generate pulses on further objects.

Block 610 may include detecting return light pulses from the second lidar device at the second lidar device. The return light pulses from the second lidar device may be light pulses reflected from objects or atmospheric scattering medium present in the environment. The detector at the second lidar device listens to the return light pulses as a time-domain signal and samples the signal at a fixed rate. These samples may see any atmospheric scattering medium that is present in the environment because there is no threshold applied to them. Groupings of contiguous samples that are preserved are considered pulses.

Block 612 can include determining a differential in a statistical distribution between the return light pulses from the first lidar device and the return light pulses from the second lidar device. The differential in the statistical distribution can result from comparing the return pulses from the first lidar device and the return pulses from the second lidar device. By comparing the return pulses from the first lidar device, which include mostly return pulses from objects in the environment, to return pulses from the second lidar device, which include return pulses from objects as well as from atmospheric scattering media, information about the presence and location of the atmospheric scattering medium in the environment can be determined. In an example embodiment, any of the above methods described for determining the differential in the statistical distribution can be used. For example, the return pulses from the first lidar device may be used instead of the return light pulses from the first group of channels and the return pulses from the second lidar device may be used instead of the return light pulses from the second group of channels.

Block 614 can include, based on previously determining the differential, detecting an atmospheric scattering medium in the environment surrounding the first lidar device and the second lidar device. A positive differential from comparing the return light pulses from the first lidar with the return light pulses from the second lidar device may indicate the presence of an atmospheric scattering medium in the environment. A differential of zero indicates that there is no detectable atmospheric scattering medium in the environment.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    dividing a plurality of light detection and ranging (lidar) device channels into at least a first group of channels and a second group of channels, wherein the first group of channels and the second group of channels are interleaved;
    applying a threshold to at least the first group of channels;
    emitting light pulses from a lidar device into an environment surrounding the lidar device;
    detecting return light pulses in the first group of channels and the second group of channels, wherein the return light pulses in the first group of channels are sampled from the signals that exceed the threshold;
    determining a differential in a statistical distribution between the return light pulses in the first group of channels and the return light pulses in the second group of channels; and
    based on the differential, detecting an atmospheric scattering medium in the environment surrounding the lidar device.

2. The method of claim 1, wherein the lidar device is configured to emit light pulses into an environment and to generate a signal resulting from (i) reflections of the emitted light pulses by one or more objects in the environment and (ii) reflections of the emitted light pulses by the atmospheric scattering medium in the environment surrounding the lidar device.

3. The method of claim 1, wherein determining the differential in the statistical distribution between the return light pulses in the first group of channels and the return light pulses in the second group of channels comprises:
    voxelizing a coordinate system of the lidar device;
    determining, for each voxel, excess return light pulses, wherein the excess return light pulses are the difference between the return light pulses in the first group of channels and the second group of channels; and
    detecting, based on a positive difference, a presence of atmospheric scattering medium in the environment surrounding the lidar device.

4. The method of claim 1, wherein determining the differential in the statistical distribution between the return light pulses in the first group of channels and the return light pulses in the second group of channels comprises:
    determining a pitch and a yaw direction associated with a last return pulse in the first group of channels and a last return pulse in the second group of channels;

determining a difference between the median range of a last return pulse in the first group of channels and the median range of a last return pulse in the second group of channels; and detecting, based on the difference, a presence of atmospheric scattering medium in the pitch and the yaw direction.

5. The method of claim 1, wherein determining the differential in the statistical distribution between the return light pulses in the first group of channels and the return light pulses in the second group of channels comprises:
determining a difference between a median range of noise returns in the first group of channels and a median range of noise returns in the second group of channels; and
determining, based on the difference, a visibility estimate.

6. The method of claim 1, wherein determining the differential in the statistical distribution between the return light pulses in the first group of channels and the return light pulses in the second group of channels comprises:
determining a first range delta between at least two range values at predetermined percentiles of noise returns in the first group of channels;
determining a second range delta between at least two range values at predetermined percentiles of noise returns in the second group of channels;
determining a range difference between the first range delta of the first group of channels and the second range delta of the second group of channels; and
determining, based on the range difference, a visibility estimate.

7. The method of claim 1, wherein determining the differential in the statistical distribution between the return light pulses in the first group of channels and the return light pulses in the second group of channels comprises:
determining a difference between an average number of return light pulses per emitted light pulses in the first group of channels and an average number of return light pulses per emitted light pulses in the second group of channels; and
determining, based on the difference, a visibility estimate.

8. The method of claim 1, wherein the threshold is a ramped-in-time threshold.

9. The method of claim 1, wherein the interleaved channels comprises a pattern of two first groups of channels and one second group of channels.

10. The method of claim 1, further comprising:
dividing the plurality of lidar device channels into a third group of channels, wherein the first group of channels, the second group of channels, and the third group of channels are interleaved;
detecting return light pulses emitted from the lidar device, wherein the detected return light pulses in the first group of channels are sampled from the signals that exceed a first threshold, and wherein the detected return pulses in the second group of channels are sampled from the signals that exceed a second threshold; and
comparing a first differential in a first statistical distribution between the return light pulses in the first group of channels and the return light pulses in the second group of channels, a second differential in a second statistical distribution between the return light pulses in the first group of channels and the return light pulses in the third group of channels, and a third differential in a third statistical distribution between the return light pulses in the second group of channels and the return light pulses in the third group of channels to determine if at least two of the differentials match.

11. A method comprising:
determining that a first light detection and ranging (lidar) device and a second lidar device have an overlapping field of view;
applying a threshold to the first lidar device;
emitting light pulses from the first lidar device and emitting light pulses from the second lidar device into an environment surrounding the lidar devices;
detecting return light pulses from the first lidar device at the first lidar device, wherein the return light pulses from the first lidar device are sampled from the signals that exceed the threshold;
detecting return light pulses from the second lidar device at the second lidar device;
determining a differential in a statistical distribution between the return light pulses from the first lidar device and the return light pulses from the second lidar device; and
based on the differential, detecting an atmospheric scattering medium in the environment surrounding the first lidar device and the second lidar device.

12. A system comprising:
a light detection and ranging (lidar) device comprising a light detector; and
a controller comprising at least one processor and a non-transitory computer-readable medium wherein the non-transitory computer-readable medium stores a set of program instructions, wherein the at least one processor executes the program instructions so as to carry out operations, the operations comprising:
dividing a plurality of lidar device channels into at least a first group of channels and a second group of channels, wherein the first group of channels and the second group of channels are interleaved;
applying a threshold to at least the first group of channels;
emitting light pulses from the lidar device into an environment surrounding the lidar device;
detecting return light pulses in the first group of channels and the second group of channels, wherein the return light pulses in the first group of channels are sampled from the signals that exceed the threshold;
determining a differential in a statistical distribution between the return light pulses in the first group of channels and the return light pulses in the second group of channels; and
based on the differential, detecting an atmospheric scattering medium in the environment surrounding the lidar device.

13. The system of claim 12, wherein the lidar device is configured to emit light pulses into an environment and to generate a signal resulting from (i) reflections of the emitted light pulses by one or more objects in the environment and (ii) reflections of the emitted light pulses by the atmospheric scattering medium in the environment surrounding the lidar device.

14. The system of claim 12, wherein determining the differential in the statistical distribution between the return light pulses in the first group of channels and the return light pulses in the second group of channels comprises:
voxelizing a coordinate system of the lidar device;
determining, for each voxel, excess return light pulses, wherein the excess return light pulses are the difference between the return light pulses in the first group of channels and the second group of channels; and
detecting, based on a positive difference, a presence of atmospheric scattering medium in the environment surrounding the lidar device.

15. The system of claim 12, wherein determining the differential in the statistical distribution between the return light pulses in the first group of channels and the return light pulses in the second group of channels comprises:
- determining a pitch and a yaw direction associated with a last return pulse in the first group of channels and a last return pulse in the second group of channels;
- determining a difference between the median range of a last return pulse in the first group of channels and the median range of a last return pulse in the second group of channels; and
- detecting, based on the difference, a presence of atmospheric scattering medium in the pitch and the yaw direction.

16. The system of claim 12, wherein determining the differential in the statistical distribution between the return light pulses in the first group of channels and the return light pulses in the second group of channels comprises:
- determining a difference between a median range of noise returns in the first group of channels and a median range of noise returns in the second group of channels; and
- determining, based on the difference, a visibility estimate.

17. The system of claim 12, wherein determining the differential in the statistical distribution between the return light pulses in the first group of channels and the return light pulses in the second group of channels comprises:
- determining a first range delta between at least two range values at predetermined percentiles of noise returns in the first group of channels;
- determining a second range delta between at least two range values at predetermined percentiles of noise returns in the second group of channels;
- determining a range difference between the first range delta of the first group of channels and the second range delta of the second group of channels; and
- determining, based on the range difference, a visibility estimate.

18. The system of claim 12, wherein determining the differential in the statistical distribution between the return light pulses in the first group of channels and the return light pulses in the second group of channels comprises:
- determining a difference between an average number of return light pulses per emitted light pulses in the first group of channels and an average number of return light pulses per emitted light pulses in the second group of channels; and
- determining, based on the difference, a visibility estimate.

19. The system of claim 12, wherein the threshold is a ramped-in-time threshold.

20. The system of claim 12, wherein the interleaved channels comprises a pattern of two first groups of channels and one second group of channels.

\* \* \* \* \*